United States Patent
Broer et al.

(10) Patent No.: US 6,193,937 B1
(45) Date of Patent: Feb. 27, 2001

(54) APPARATUS FOR MANUFACTURING A BROADBAND CHOLESTERIC POLARIZER

(75) Inventors: Dirk J. Broer; Johannes A. M. M. Van Haaren, both of Einhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/264,911

(22) Filed: Mar. 9, 1999

Related U.S. Application Data

(62) Division of application No. 08/911,078, filed on Aug. 14, 1997, now Pat. No. 5,948,831.

(30) Foreign Application Priority Data

Aug. 21, 1996 (EP) .................................................. 96202326

(51) Int. Cl.[7] .................................................. B01J 19/08
(52) U.S. Cl. .................................... 422/186.3; 422/82.05; 422/82.09; 356/72
(58) Field of Search ............................. 422/186.3, 82.05, 422/82.09; 356/72

(56) References Cited

U.S. PATENT DOCUMENTS

| | | | |
|---|---|---|---|
| 5,188,760 | 2/1993 | Hikmet et al. ................... | 252/299.01 |
| 5,506,704 | 4/1996 | Broer et al. ............................. | 359/63 |
| 5,606,171 | * 2/1997 | Neckers et al. .................... | 250/459.1 |
| 5,721,603 | 2/1998 | De Vaan et al. ..................... | 349/194 |
| 5,737,044 | 4/1998 | Van Haaren et al. ................. | 349/61 |
| 5,825,444 | 10/1998 | Broer et al. ........................... | 349/98 |

* cited by examiner

*Primary Examiner*—Kishor Mayekar
(74) *Attorney, Agent, or Firm*—F. Brice Faller

(57) ABSTRACT

The Application describes a method and devices for manufacturing a broadband cholesteric polarizer having a well-defined bandwidth and edge position. To this end, a liquid-crystalline cholesterically ordered layer comprising reactive chiral monomers and reactive nematogenic monomers having a different reactivity is polymerized by exposure to radiation. The invention is characterized in that the intensity of the radiation is increased substantially, preferably by a factor of 10 or more, when a desired edge position of the band is reached. As a result, the bandwidth and edge position of the reflection band reached at that moment are frozen as it were. A monochromatic sensor can be used to determine whether said edge position has been reached, the wavelength used by the sensor corresponding to the wavelength of the desired edge position of the band. Broadband, cholesteric polarizers having a well-defined bandwidth and edge position can very advantageously be used in a display.

20 Claims, 3 Drawing Sheets

APPARATUS FOR MANUFACTURING A BROADBAND CHOLESTERIC POLARIZER

CROSS REFERENCE TO RELATED APPLICATIONS

This is a divisional of application Ser. No. 08/911,078, filed Aug. 14, 1997 now U.S. Pat. No. 5,948,831.

BACKGROUND OF THE INVENTION

The invention relates to apparatus for manufacturing a broadband cholesteric polarizer, in which a liquid-crystalline, cholesterically ordered layer comprising reactive chiral monomers and reactive nematogenic monomers of different reactivity is polymerized by exposure to radiation.

Broadband cholesteric polarizers and methods of manufacturing same are known per se, for example, from EP-A 0606939 (U.S. Pat. No. 5,721,603), EP-A 0606940 (U.S. Pat. No. 5,506,704) and WO 96/02016 (U.S. Pat. No. 5,737,044). By means of cholesteric polarizers it is possible to convert unpolarized light to circularly polarized light in a substantially loss-free manner. Polarizers of this type comprise a thin layer of a cholesterically (i.e. chirally nematically) ordered material. This material contains chiral, liquid-crystalline molecules having such a structure that they order themselves more or less spontaneously into a spiral-shaped or helical structure. The pitch of this helix can be increased by adding a quantity of a non-chiral, liquid-crystalline (i.e. nematogenic) material to the chiral, liquid-crystalline material. The exact pitch is governed by the ratio between the quantities of chiral and non-chiral liquid-crystalline molecules as well as by their chemical structure.

If this material is provided in the form of a thin layer on a substrate or between two substrates, the helical structure assumes such an orientation that the axis of the helix extends transversely to the layer. Such a layer is capable of reflecting a narrow band of light whose wavelength corresponds to the product of the pitch and the refractive index of the material and whose direction of polarization corresponds to the handedness of the helical structure. By virtue of this property, a cholesteric layer can very suitably be used in an optical polarizer. It is noted that the expression "the refractive index" of a material is to be understood to mean in this context the geometric mean $(n_e+n_o)/2$ of the ordinary refractive index $n_o$ and the extraordinary refractive index $n_e$ of this material.

Broadband cholesteric polarizers are distinguished from the customary cholesteric polarizers by the presence of a relatively broad reflection band. The bandwidth of the customary cholesteric polarizers is only approximately 40–50 nm. In the case of broadband polarizers, bandwidths of 100 nm, 150 nm, 200 nm and even more than 400 nm have been achieved. It is noted that the band position of a cholesteric filter is defined as the center of the wavelength range in which the reflection takes place. A width of a band is defined as the difference in wavelength between the long-wave and the short-wave edge positions of the band. The wavelength of an edge position is defined as the wavelength at which the intensity amounts to 50% of the maximum intensity.

EP 606940 describes an elegant method of manufacturing a broadband cholesteric polarizer. Use is made of a mixture comprising reactive chiral monomers and reactive nematogenic monomers, which exhibit a different reactivity. For the reactive monomers use can be made of compounds containing a reactive group on the basis of acrylates, epoxy compounds, vinylethers and thiolene systems, as described, inter alia, in U.S. Pat. No. 5,188,760. Monomers containing different reactive groups generally exhibit a different reactivity. A difference in reactivity also occurs if one type of monomers contains one reactive group and the other type of monomers contains two (identical) reactive groups.

A layer of this mixture is polymerized by means of (actinic) radiation, in particular UV radiation. In this process, the conditions are selected in such a manner that during the polymerization operation a radiation profile of varied intensity is formed in the layer. As a result, diffusion processes take place in the cholesteric layer during polymerization. This leads to a variation in the composition of the helical structure, so that the pitch, viewed across the thickness of the layer, varies within certain limits. As a result, this cholesteric polarizer exhibits a relatively broad reflection band.

It has been found that the method described in EP-A 696940 can be improved. The Applicant has experimentally established that small fluctuations, for example in the radiation gradient or in the UV intensity, can strongly influence the diffusion processes of the reactive monomers. This may lead to relatively large differences in the bandwidth of the cholesteric polarizers manufactured by means of said known method. Therefore said known method should be improved, in particular, with respect to the reproducible manufacture of polarizers having a correct position of one of the two edges of the reflection band. This applies, for example, to polarizers as described in EP-A 95203209.2 (U.S. Pat. No. 5,825,444).

SUMMARY OF THE INVENTION

It is an object of the invention to improve the known method. The invention more particularly aims at providing a method of manufacturing broadband cholesteric polarizers of which the position of one of the two edges of the reflection band can be adjusted in a very reproducible manner. The method in accordance with the invention should enable these polarizers to be mass-produced.

These and other objects of the invention are achieved by substantially increasing the intensity of the radiation when the band reaches a desired edge position.

The invention is based on the experimentally gained insight that the intensity of the radiation used during polymerization plays an important part in the manufacture of broadband polarizers. It has been demonstrated that the eventually achieved bandwidth is governed to a substantial degree by the radiation intensity used. If use is made of a relatively high UV intensity (typically 0.5 mW/cm$^2$ or higher), the eventually achieved bandwidth is found to be relatively small, and it differs hardly from that of the unpolymerized mixture. If a relatively low radiation intensity (typically 0.05 mW/cm$^2$ or lower) is used, a much broader reflection band is obtained. Under these conditions, first, a colored, narrow reflection band is formed, which subsequently broadens into an uncolored, broadband reflection band. A substantial increase of the intensity causes the bandwidth obtained at that instant to be frozen, as it were. It has been demonstrated that the increase in intensity should preferably be a factor of 10 or more to bring about the frozen state. Preferably, this factor is 20 or more. Under these conditions, the cholesterically ordered layer instantly become completely polymerized.

A preferred embodiment of the method in accordance with the invention is characterized in that the attainment of the desired edge position of the band is determined by means of a monochromatic photosensor, the wavelength used by the sensor corresponding to the wavelength of the desired edge position of the band. Such a photosensor comprises a photodetector as well as a monochromatic light source. A laser can very advantageously be used as the monochromatic light source in the sensor.

The sensor can be used in reflection. Said sensor is constructed in such a manner that the monochromatic light, which emanates from the light source and which is used in the measuring operation, is directed to the layer to be polymerized. As long as the wavelength of the edge position of the reflection band is not equal to that of the monochromatic light, this light will pass through the layer to be polymerized (transmission). As soon as the bandwidth assumes such a value that the two wavelengths coincide, reflection of the monochromatic light occurs. A proper positioning of the layer, the light source and the detector causes this light to be reflected toward the detector. At this moment, the intensity of the polymerization radiation should be increased. To this end, a second polymerization lamp having a higher radiation intensity is activated or, preferably, a filter situated in front of the polymerization lamp is removed. Instead of a (mechanically) movable filter, use can also advantageously be made of a filter whose transmission is adjustable.

Another preferred embodiment of the method in accordance with the invention is characterized in that the desired edge position of the band is determined by means of a transmission measurement. For this purpose, the sensor is constructed so that the light source and the detector are situated on either side of the layer to be polymerized. In this case, the sensor is activated as soon as the detector detects a substantial reduction in intensity of the light emanating from the light source. Such an arrangement has the advantage that the exact alignment of the layer to be polymerized does not affect the measuring results of the sensor.

Another suitable embodiment of the method in accordance with the invention is characterized in that the liquid crystalline, cholesterically ordered layer is passed through an illumination tunnel which is provided with a number of compartments which comprise a radiation source as well as a light sensor by means of which the intensity of the radiation incident on the layer can be changed. This embodiment enables broadband, cholesteric polarizers to be manufactured in a continuous process. This has a favorable effect on the cost price per unit area.

The invention also relates to a device for manufacturing a broadband cholesteric polarizer, which is characterized by a radiation compartment comprising
  a) means for positioning the polarizer to be manufactured,
  b) a radiation source for the irradiation of the polarizer to be manufactured and
  c) a monochromatic photosensor comprising a photodetector as well as a monochromatic light source.

This device in accordance with the invention enables broadband polarizers to be manufactured in batch processes. Preferably, the photodetector and the monochromatic light source are positioned in the radiation compartment in such a manner that the sensor measures in the transmission. To this end, the polarizer to be manufactured is situated between the detector and the light source during operation of the device.

Another device in accordance with the invention, which is used to manufacture a broadband cholesteric polarizer, is characterized in that the device comprises a number of radiation compartments, which are provided with
  a) means for passing a substrate through the radiation compartments,
  b) a radiation source for irradiating the substrate to be passed through said compartments, and
  c) a monochromatic photosensor which comprises a photodetector as well as a monochromatic light source.

This device in accordance with the invention enables broadband polarizers to be manufactured in a continuous process. Preferably, the photodetector and the monochromatic light source are positioned in the radiation compartments in such a manner that the sensors measure in transmission. For this purpose, the—preferably elongated—substrate to be passed through the radiation compartments is situated between the detector and the light source during operation of the device.

To increase the radiation intensity, use can be made, for example, of a second radiation source having a higher intensity. This source should be driven by the photosensor. A cheaper preferred embodiment of both devices in accordance with the invention is however characterized in that the compartments comprise an optical filter which can be displaced by driving the sensor. Such a filter preferably passes 10% or less of the radiation produced by the lamp. It is noted that an adjustable-transmission filter can be used instead of a displaceable filter.

These and other aspects of the invention will be apparent from and elucidated with reference to the embodiments described hereinafter.

It is noted that the Figures are not drawn to scale.

DESCRIPTION OF THE PREFERRED EMBODIMENTS

Figure 1:
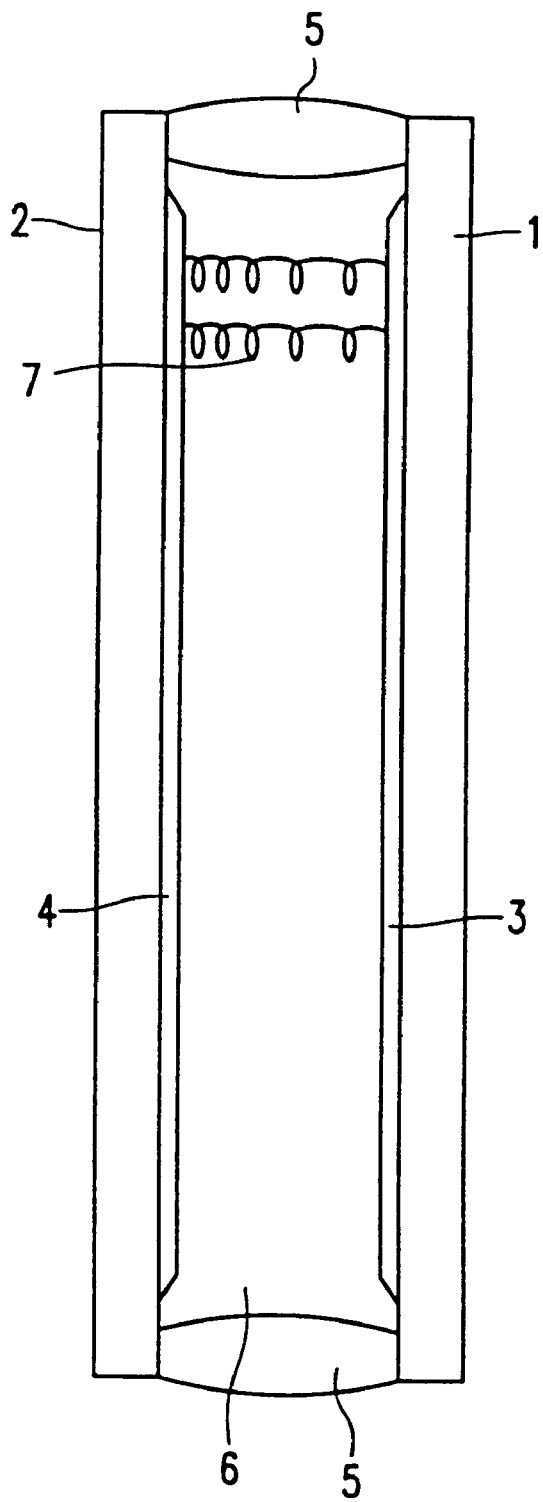
FIG. 1 schematically shows a broadband cholesteric polarizer which can be manufactured by means of the method in accordance with the invention.

FIG. 1 shows an embodiment of a broadband cholesteric polarizer which is manufactured by means of the method according to the invention. This polarizer comprises two flat, transparent substrates 1 and 2, which are made, for example, of glass and which are positioned substantially parallel to each other and at some distance from each other. The facing surfaces of the substrates are provided with an orientation layer 3 and 4, for example, of rubbed polyimide or sputtered $SiO_x$. A spacer 5 is provided at the edges of the substrates.

A layer 6 of a cholesterically ordered polymeric material is situated between the two substrates. The axis of the molecular helix of the cholesterically ordered material extends transversely to the layer. The molecular helix has a variable pitch which increases continuously from one surface of layer 6 to the other surface. This is schematically shown by means of two spiral-shaped structures 7. The thickness of layer 6 typically ranges from 3 to 40 micrometers, preferably from 5 to 25 micrometers.

Figure 2A:
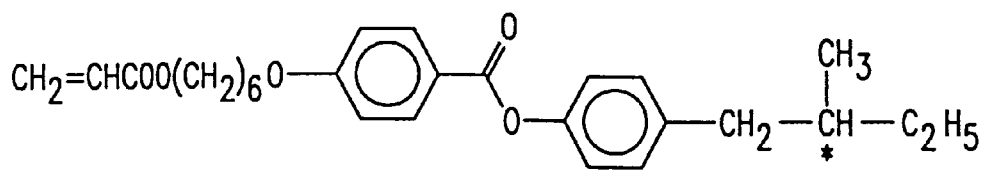
FIG. 2A shows a chemical compound which is a suitable chiral monomer for practicing the invention.
Figure 2B:
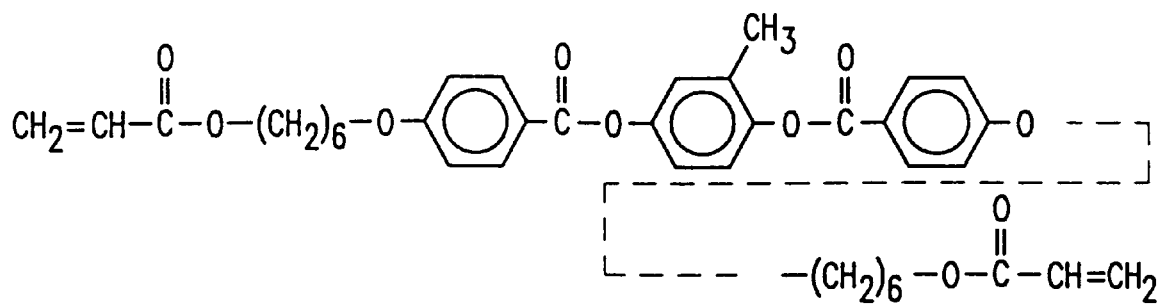
FIG. 2B shows chemical compound which is a suitable nematogenic monomer for practicing the invention.
Figure 2C:
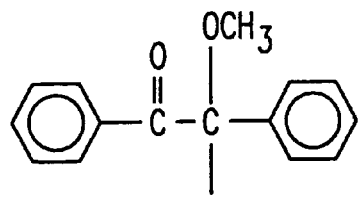
FIG. 2C shows a chemical compound which is a suitable photoinitiator for practicing the invention.
Figure 2D:
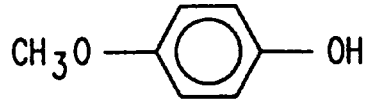
FIG. 2D shows a chemical compound which is a suitable stablizier for practicing the invention.
Figure 2E:
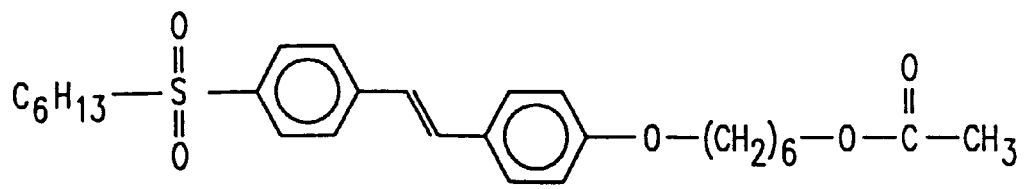
FIG. 2E shows a chemical compound which is a suitable dye for practicing the present invention.

The above-described embodiment of the cholesteric polarizer in accordance with the invention was manufactured as follows. First, a mixture containing reactive monomers was prepared. This mixture contained 35 wt. % of the chiral monomer shown in FIG. 2A and 65 wt. % of the nematogenic monomer shown in FIG 2B. The chiral monomer contains one reactive group per molecule and the nematogenic monomer contains two reactive groups per molecule. In this case, acrylate groups were used. The difference in reactivity between both monomers can be attributed to the different number of reactive groups per molecule. Subsequently, 2 wt. % of the photoinitiator Irgacure 651 (Ciba Geigy; structural formula shown in FIG. 2C) and 0.001 wt. % p-methoxyphenol (stabilizer; structural formula shown in FIG. 2D) as well as 1 wt. % of a dye (structural formula shown in FIG. 2E) were added to this mixture. This dye exhibits an absorption maximum around 334 nm and an extinction coefficient of 31524 l/mol.cm. This dye enables the intensity gradient of the radiation used to be set more easily. This is described in greater detail in EP 606.940.

The mixture thus prepared was subsequently provided between two transparent substrates. These substrates were provided with a layer of a rubbed polyimide.

These layers serve to improve the alignment of the molecular helix, which develops spontaneously in the cholesteric mixture. It is not absolutely necessary to use substrates which are provided with orientation layers. In the manufacture of (very) thin optically active layers, generally spontaneous orientation of the chiral and nematogrenic groups takes place. However, the presence of orientation layers during polymerization does lead to an improved orientation of the optically active layer, so that the optical properties of the polarizers are improved substantially.

Figure 3:
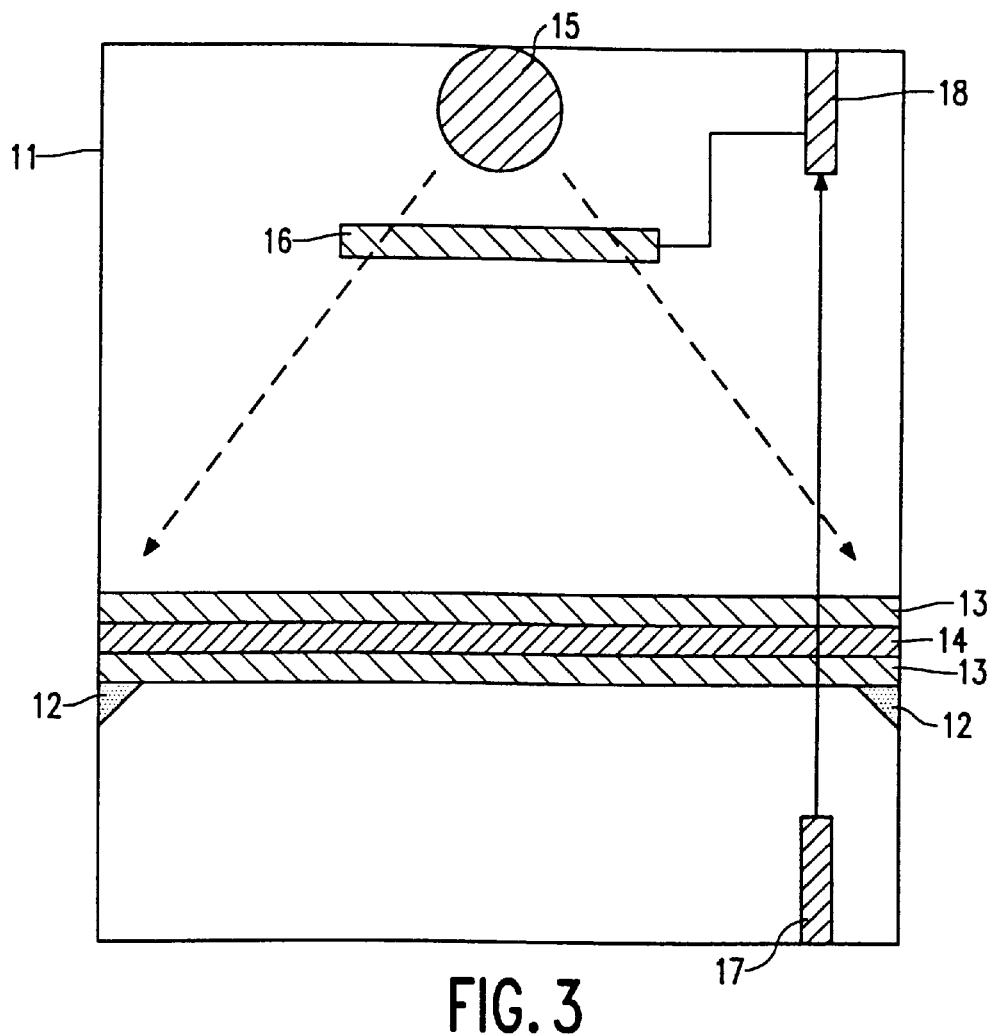
FIG. 3 schematically shows a first device in accordance with the invention, which can be used to carry out the method according to the invention, FIG. 4 schematically shows a second device in accordance with the invention, which can be used to carry out the method according to the invention.

The polymerization of the cholesteric layer will be explained in greater detail by means of the schematic, sectional view of the inventive device shown in FIG. 3. This device comprises a radiation compartment 11. This is provided with means for positioning the broadband cholesteric polarizer to be manufactured. In the device shown, these means are constructed as support bodies 12. In the present case, the polarizer comprises two substrates 13 and a cholesterically ordered layer 14 situated between the substrates. It is noted that the method and device in accordance with the invention can also be used to manufacture polarizers in which only one substrate is used.

Compartment 11 further comprises a radiation source in the form of an UV lamp. The power of the lamp and the distance between the lamp and the polarizer to be irradiated are selected in such a manner that the average illumination intensity to which the cholesteric layer is exposed during operation of the device is approximately 0.9 mW/cm$^2$. A neutral-density filter 16 whose position or transmission is adjustable is arranged between the UV lamp and the polarizer. When the filter operates at maximum capacity, the radiation originating from the UV lamp is filtered in such a manner that the average illumination intensity on the polarizer is only approximately 0.03 mW/cm$^2$.

Compartment 11 also comprises a photosensor which consists of a monochromatic light source 17 in the form of a laser and of a photodetector 18. The wavelength of the laser is selected to be such that it is equal to the edge position of the broadband polarizer to be manufactured. The sensor measures in transmission, so that the detector and the light source are situated on opposite sides of the polarizer which is the subject of measurements. The sensor is coupled to the filter 16. As soon as the transmission of the polarizer decreases substantially (50% or more) during illumination, the sensor supplies a signal which causes the neutral density filter 16 to be activated. Depending on the type of filter, this is either removed from its position between the radiation source 15 and the polarizer or the transmission of the filter is maximized. By virtue thereof, the radiation intensity on the polarizer increases by a factor of 30, which results in the instantaneous, complete polymerization of the cholesteric layer. As a result, the bandwidth as well as the exact position of one of the band edges is defined.

Figure 4:
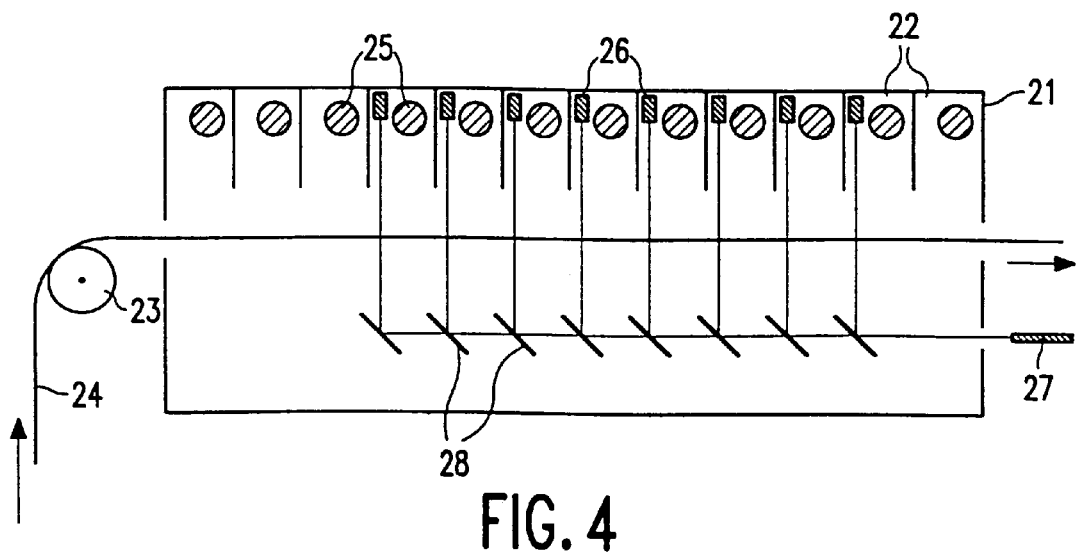

FIG. 4 is a schematic, sectional view of a device in accordance with the invention for mass-producing broadband cholesteric polarizers. This device comprises a temperature-controlled radiation tunnel 21 which accommodates a number of radiation compartments 22. The radiation tunnel is provided with feed means, for example in the form of drivable rollers 23, enabling an elongated, flexible substrate 24 to be continuously fed through. This substrate may consist, for example, of a thin, transparent foil carrying a cholesterically ordered layer of a mixture of reactive, liquid-crystalline monomers to be polymerized.

The compartments 22 are each provided with a radiation source 25, for example in the form of an UV lamp which is used to irradiate the substrate while it is being fed through the radiation tunnel 21. A number of the compartments 22 are provided with a photodetector 26 and with a monochromatic light source in the form of a single laser 27. In the present case, the partially transmissive mirrors 28 divide the laser beam of laser 27 into a number of deflecting sub-beams which are incident on the photodetector via the substrate.

The method in accordance with the invention can be applied continuously by providing a substrate which is transparent to the laser light used with a cholesterically ordered layer of a liquid-crystalline material. This substrate is passed through the radiation tunnel by drive means. In this process, the substrate is fed past a number of radiation compartments in which it is exposed to an UV lamp of a relatively low intensity (0.05 mW/cm$^2$ or less).

At a given moment, the reflection band will have reached such a width, as a result of the polymerization process, that the wavelength of one of the edge positions is equal to that of the laser used. At that moment, the intensity measured by the photodetector is reduced substantially. A signal is then given which causes the radiation intensity to be increased substantially, for example, by a factor of 10 or more. As a result, instantaneous, complete polymerization of the liquid-crystalline material takes place, so that the measured edge position and bandwidth become frozen, as it were. The egressing substrate with the polymerized, broadband, cholesterically ordered layer can be processed further, in a manner which is well-known to those skilled in the art, to form a broadband cholesteric polarizer. To this end, the substrate is cut to the proper dimensions and, if necessary, provided with a quarter lambda foil if the transmitted light should be circularly polarized. If necessary, the contrast can be increased by providing the filter with a dichroic polarization foil.

The method in accordance with the invention enables broadband cholesteric polarizers having an accurately adjusted edge position to be manufactured. By virtue thereof, the viewing-angle dependence of a display provided with such a polarizer can be reduced. By means of the devices in accordance with the invention, the polarizers can be produced in batch processes or continuous processes.

What is claimed is:

1. A device for manufacturing a broadband cholesteric polarizer, the device comprising a radiation compartment having
    a) means for positioning a layer of reactive material, and
    b) a radiation source for irradiating the layer of reactive material,
    characterized in that the device further comprises
    c) a monochromatic photosensor comprising a monochromatic light source arranged at a first side of said layer to direct a monochromatic beam of light of a given wavelength toward said layer, and a photodetector arranged at a second side of said layer to detect the intensity of light of said given wavelength coming from said layer.

2. A device as claimed in claim 1, further comprising an optical filter arranged between the radiation source and the layer, said optical filter passing at most 10% of the radiation from said radiation source, and said optical filter being displaceable by the photodetector.

3. A device as claimed in claim 1, further comprising an optical filter arranged between the radiation source and the layer, said optical filter having a transmission which is adjustable by said photodetector, at maximum filtering said optical filter passing at most 10% of the radiation from said radiation source.

4. A device as claimed in claim 1, characterized in that said second side and said first side are a same side, said photodetector detecting the intensity of light of said given wavelength reflected by said layer.

5. A device as claimed in claim 4, characterized in that said device comprises means for controlling the intensity of radiation from said radiation source to which the layer is exposed, and
    said photodetector comprises means, responsive to an increase in the detected intensity of the reflected light, for increasing the intensity of irradiation to which the layer is exposed.

6. A device as claimed in claim 1, characterized in that said second side is opposite to said first side, and said photodetector detects the intensity of light of said given wavelength transmitted through said layer.

7. A device as claimed in claim 6, characterized in that said device comprises means for controlling the intensity of radiation from said radiation source to which the layer is exposed, and
    said photodetector comprises means, responsive to a decrease in the detected intensity of said light to a given value, for increasing the intensity of irradiation to which the layer is exposed.

8. A device as claimed in claim 7, characterized in that said decrease in the detected intensity is a decrease of at least 50%.

9. A device as claimed in claim 7, characterized in that said means for controlling comprises an optical filter arranged between the radiation source and the layer.

10. A device as claimed in claim 9, characterized in that said filter passes at most 10% of the radiation from said radiation source, and said means for increasing displaces said filter.

11. A device as claimed in claim 9, characterized in that said optical filter has a transmission which is adjustable by said photodetector.

12. A device for manufacturing a broadband cholesteric polarizer, comprising a plurality of radiation compartments, and means for passing a substrate through the radiation compartments,
    each of said compartments comprising a respective radiation source for irradiating the substrate passed through said compartments,
    characterized in that the device further comprises a monochromatic photosensor comprising a monochromatic light source arranged at a first side of said substrate to direct a monochromatic beam of light of a given wavelength into each compartment toward said substrate, and a respective photodetector arranged in each compartment at a second side of said substrate to detect the intensity of light of said given wavelength coming from said substrate.

13. A device as claimed in claim 12, further comprising an optical filter arranged between the radiation source and the substrate, said optical filter being displaceable by the photodetector.

14. A device as claimed in claim 12, further comprising an optical filter arranged between the radiation source and the substrate, said optical filter having a transmission which is adjustable by said photodetector.

15. A device as claimed in claim 12, characterized in that said second side and said first side are a same side, each respective photodetector detecting the intensity of light of said given wavelength reflected by said substrate,
    said device comprises means for respectively controlling the intensity of radiation from each respective radiation source to which the layer is exposed, and
    each photodetector comprises means, responsive to an increase in the detected intensity of the reflected light, for increasing the intensity of irradiation to which the substrate in the respective compartment is exposed.

16. A device as claimed in claim 12, characterized in that said second side is opposite to said first side, and each said photodetector detects the intensity of light of said given wavelength transmitted through said substrate.

17. A device as claimed in claim 16, characterized in that said device comprises means for controlling the intensity of radiation from the respective radiation sources to which the substrate is exposed, and
    each respective photodetector comprises means, responsive to a decrease in the detected intensity of said light to a given value, for increasing the intensity of irradiation in the corresponding compartment.

18. A device as claimed in claim 17, characterized in that said means for controlling comprises an optical filter arranged between the radiation source and the substrate.

19. A device as claimed in claim 18, characterized in that said filter passes at most 10% of the radiation from said radiation source, and said means for increasing displaces said filter.

20. A device as claimed in claim 18, characterized in that said optical filter has a transmission which is adjustable by said photodetector.

* * * * *